US009989157B2

(12) United States Patent
Hunter

(10) Patent No.: US 9,989,157 B2
(45) Date of Patent: Jun. 5, 2018

(54) VALVE VENTED REDUNDANT STEM SEAL SYSTEM

(71) Applicant: Vetco Gray Inc., Houston, TX (US)

(72) Inventor: Rick C. Hunter, Friendswood, TX (US)

(73) Assignee: Vetco Gray, LLC, Houston, TX (US)

(*) Notice: Subject to any disclaimer, the term of this patent is extended or adjusted under 35 U.S.C. 154(b) by 0 days. days.

(21) Appl. No.: 14/690,689

(22) Filed: Apr. 20, 2015

(65) Prior Publication Data

US 2015/0226338 A1   Aug. 13, 2015

Related U.S. Application Data

(63) Continuation of application No. 13/333,024, filed on Dec. 21, 2011, now Pat. No. 9,010,725.

(51) Int. Cl.
*F16K 3/02*      (2006.01)
*F16K 39/04*    (2006.01)
(Continued)

(52) U.S. Cl.
CPC ......... *F16K 3/0227* (2013.01); *F16J 15/3212* (2013.01); *F16J 15/3236* (2013.01); *F16K 39/04* (2013.01); *F16K 41/08* (2013.01)

(58) Field of Classification Search
CPC ...... F16K 3/0227; F16K 3/0236; F16K 39/04; F16K 41/08; F16K 41/02; F16K 41/04; F16K 41/06; F16J 15/3212; F16J 15/3236
(Continued)

(56) References Cited

U.S. PATENT DOCUMENTS 765,430 A    7/1904  Huxley
3,060,964 A * 10/1962 Bagwell ............ F16K 24/02
                                                137/601.15
(Continued)

FOREIGN PATENT DOCUMENTS

CN    102094987 A    6/2011
EP      0308390      6/1992
(Continued)

OTHER PUBLICATIONS

Search Report from corresponding GB Application No. GB 1222192.5 dated Jan. 22, 2013.
(Continued)

*Primary Examiner* — Mary McManmon
*Assistant Examiner* — David Colon Morales
(74) *Attorney, Agent, or Firm* — Hogan Lovells US LLP

(57) ABSTRACT

A valve stem packing assembly can seal a valve stem to a valve body having a body cavity. The packing assembly includes a packing ring circumscribing the valve stem within a stem opening extending axially through the valve body. A primary dynamic seal is positioned to seal a dynamic leak path between the packing ring and the valve stem. A secondary dynamic seal is spaced axially apart and functionally independent from the primary dynamic seal and positioned to redundantly seal the dynamic leak path. A primary static seal is positioned to seal a static leak path between the packing ring and the valve body. A secondary static seal is spaced axially apart and functionally independent from the primary static seal and positioned to redundantly seal the static leak path.

19 Claims, 5 Drawing Sheets

(51) Int. Cl.
*F16K 41/08* (2006.01)
*F16J 15/3212* (2016.01)
*F16J 15/3236* (2016.01)

(58) Field of Classification Search
USPC .................................. 251/214, 326, 330
See application file for complete search history.

(56) References Cited

U.S. PATENT DOCUMENTS

| | | | | |
|---|---|---|---|---|
| 3,421,547 A * | 1/1969 | Aslan | .................... | F16K 15/044 |
| | | | | 137/539 |
| 3,765,690 A | 10/1973 | Sievenpiper | | |
| 3,921,991 A | 11/1975 | Beck | | |
| 3,958,592 A * | 5/1976 | Wells | .................... | F16K 3/0254 |
| | | | | 137/237 |
| 3,990,679 A * | 11/1976 | Boitnott | ................. | F16J 15/006 |
| | | | | 251/214 |
| 4,112,969 A | 9/1978 | Still | | |
| 4,230,299 A * | 10/1980 | Pierce, Jr. | ................ | E21B 34/02 |
| | | | | 137/315.28 |
| 4,274,432 A * | 6/1981 | Tunstall | ................ | F16K 3/0254 |
| | | | | 137/315.28 |
| 4,281,819 A * | 8/1981 | Linder | .................... | F16K 3/316 |
| | | | | 251/282 |
| 4,340,204 A * | 7/1982 | Herd | ......................... | F16K 3/36 |
| | | | | 251/214 |
| 4,363,465 A | 12/1982 | Morrill | | |
| 4,364,544 A | 12/1982 | Kim | | |
| 4,451,047 A * | 5/1984 | Herd | ..................... | F16J 15/183 |
| | | | | 251/214 |
| 4,531,711 A * | 7/1985 | Bunch | .................. | F16J 15/3236 |
| | | | | 251/214 |
| 4,541,449 A | 9/1985 | Burke | | |
| 4,568,062 A | 2/1986 | Regitz | | |
| 4,570,659 A | 2/1986 | Karr, Jr. | | |
| 4,576,385 A | 3/1986 | Ungchusri et al. | | |
| 4,577,873 A * | 3/1986 | Baumann | ................. | F16J 15/18 |
| | | | | 277/520 |
| 4,592,558 A | 6/1986 | Hopkins | | |
| 4,658,847 A | 4/1987 | McCrone | | |
| 4,706,970 A | 11/1987 | Ramirez | | |
| 4,878,651 A | 11/1989 | Meyer, Jr. | | |
| 4,886,241 A * | 12/1989 | Davis | ..................... | F16J 15/166 |
| | | | | 251/214 |
| 4,893,650 A * | 1/1990 | Chisholm | .............. | F16K 15/044 |
| | | | | 137/539 |
| 5,031,923 A * | 7/1991 | Davies | ................... | F16K 41/026 |
| | | | | 251/214 |
| 5,078,175 A | 1/1992 | Martin et al. | | |
| 5,094,270 A | 3/1992 | Reimert | | |
| 5,192,051 A | 3/1992 | Roberson | | |
| 5,201,872 A | 4/1993 | Dyer | | |
| 5,230,498 A * | 7/1993 | Wood | ..................... | F16J 15/186 |
| | | | | 137/553 |
| 5,238,252 A * | 8/1993 | Stewen | ................... | F16K 41/02 |
| | | | | 251/214 |
| 5,246,236 A * | 9/1993 | Szarka | ..................... | E21B 34/06 |
| | | | | 277/337 |
| 5,306,021 A | 4/1994 | Morvant | | |
| 5,375,812 A | 12/1994 | Kent | | |
| 5,624,101 A | 4/1997 | Beson | | |
| 5,730,419 A | 3/1998 | Williams et al. | | |
| 6,082,707 A | 7/2000 | Hosie | | |
| 6,260,822 B1 | 7/2001 | Puranik | | |
| 6,290,235 B1 * | 9/2001 | Albertson | .............. | F16J 15/002 |
| | | | | 277/510 |
| 6,345,805 B1 | 2/2002 | Chatufale | | |
| 6,612,537 B2 | 9/2003 | Bartlett | | |
| 6,626,239 B2 | 9/2003 | Cunningham | | |
| 6,726,220 B2 | 4/2004 | Grimanis et al. | | |
| 6,840,270 B2 * | 1/2005 | Yu | ......................... | F16K 15/044 |
| | | | | 137/533.19 |
| 6,869,079 B2 | 3/2005 | Zheng | | |
| 6,910,494 B2 * | 6/2005 | Warsakis | ................ | F16B 4/004 |
| | | | | 137/15.18 |
| 6,966,537 B2 * | 11/2005 | Sundararajan | .......... | F16K 3/207 |
| | | | | 251/172 |
| 7,004,452 B2 | 2/2006 | Chatufale | | |
| 7,111,821 B2 | 9/2006 | Promper | | |
| 7,309,058 B2 | 12/2007 | Hunter | | |
| 7,428,912 B2 * | 9/2008 | Pozzati | ................. | F16J 15/3212 |
| | | | | 137/375 |
| 7,565,913 B2 | 7/2009 | Pozzatti | | |
| 7,946,556 B1 | 5/2011 | Troll | | |
| 8,752,634 B2 | 6/2014 | Tanaka et al. | | |
| 9,010,725 B2 * | 4/2015 | Hunter | ..................... | F16K 39/04 |
| | | | | 251/214 |
| 2003/0116732 A1 | 6/2003 | Chatufale | | |
| 2003/0155717 A1 | 8/2003 | Zheng | | |
| 2007/0052181 A1 | 3/2007 | Nakamura | | |
| 2007/0085279 A1 * | 4/2007 | Burdick | ................. | F16J 15/004 |
| | | | | 277/510 |
| 2010/0052267 A1 | 3/2010 | Castleman et al. | | |
| 2010/0243936 A1 * | 9/2010 | Nesje | .................... | F16K 3/0227 |
| | | | | 251/282 |
| 2012/0080634 A1 | 4/2012 | Fenton | | |
| 2012/0085957 A1 * | 4/2012 | Dhawan | ................. | F16K 3/0209 |
| | | | | 251/326 |
| 2014/0183392 A1 | 7/2014 | Hunter et al. | | |
| 2014/0183393 A1 | 7/2014 | Hunter et al. | | |
| 2014/0183396 A1 | 7/2014 | Hunter et al. | | |

FOREIGN PATENT DOCUMENTS

| | | | | |
|---|---|---|---|---|
| EP | 0525261 A1 * | 2/1993 | .......... | F16J 15/0887 |
| EP | 1925865 A1 | 5/2008 | | |
| GB | 2103310 | 2/1983 | | |
| GB | 2284650 A | 6/1995 | | |
| WO | 2012121745 | 9/2012 | | |
| WO | 2012154056 | 11/2012 | | |

OTHER PUBLICATIONS

Chinese Office Action issued in connection with corresponding CN Application No. 201210559415.3 dated Dec. 4, 2015.

PCT Search Report and Written Opinion issued in connection with corresponding PCT Application No. PCT/US2016/025107 dated Jul. 12, 2016.

PCT Search Report and Written Opinion dated Apr. 22, 2014 in connection with related PCT Patent Application No. PCT/US2013/078434.

* cited by examiner

VALVE VENTED REDUNDANT STEM SEAL SYSTEM

CROSS REFERENCE TO RELATED APPLICATIONS

This application claims priority to and the benefit of co-pending U.S. application Ser. No. 13/333,024, titled "Valve Vented Redundant Stem Seal System," filed Dec. 21, 2011, the full disclosure of which is hereby incorporated by reference herein in its entirety.

BACKGROUND OF THE INVENTION

1. Field of the Invention

This invention relates in general to valve stem seals and, in particular, to a valve vented redundant stem seal system.

2. Brief Description of Related Art

A gate valve has a body with a central cavity that is intersected by a flow passage. A gate moves within the cavity between the open and closed positions. The gate has a hole through it that aligns with the flow passage while in the open position. The gate may be of a split type, comprising two halves or it may comprise a single slab. A stem extends into engagement with the gate for moving the gate between open and closed positions. The cavity has a central portion, which is intersected by the flow passages, and a stem portion that extends from the central portion.

In one type, the valve stem extends into rotatable engagement with a threaded nut or sleeve secured to the gate. Rotating the valve stem causes the gate to move linearly. In another type, the valve stem does not rotate. A threaded nut sleeve mounted in the bonnet of the valve engages the valve stem, and when rotated, causes the valve stem to move linearly. The threads of the sleeves and stem may slide against each other, or they may employ balls between the grooves for reducing friction.

Gate valves may be operated manually, such as with a wheel mounted to the valve stem or the nut sleeve. It is also known to utilize a remote operated vehicle (ROV) to engage and rotate a stem or nut sleeve. Hydraulically powered actuators are also utilized wherein a piston moves the valve stem linearly without rotation. Electrical actuators are also known that employ an electrical motor and a gear train to rotate a stem or nut sleeve to cause movement of the gate.

Typically, a seal in the valve stem portion of the cavity engages the valve stem to seal pressure within the cavity. The pressure exerted on the valve stem seal can be quite great, leading the valve stem seal to fail. When the valve stem seal fails it will allow fluid or gas to flow out of the valve around the valve stem. Some prior art embodiments provide a second seal that will seal the valve stem to the valve body in the event the primary seal fails. This provides redundancy within the valve stem seals that increases the reliability of the seals.

Where a second seal is used, in the event the first seal leaks, a volume of fluid will be held between the failed first seal and the second seal. Depending on the size of the spacing between the first seal and the second seal, the volume can be quite small. The small volume size allows fluid pressure within the volume to rapidly reach the internal system pressure. This is not a rare condition as many of the environments in which the valves are placed are subject to extreme pressure loads for many years, greatly increasing the likelihood that the primary seal will leak or fail. When the valve is opened, pressure may then quickly vent out past the leaking seal. This can cause further damage to the primary seal so that what had been a small leak becomes a larger failure of the primary seal. A larger failure of the primary seal may eliminate any benefit the leaking primary seal provided, increasing the likelihood of subsequent secondary seal failure. Thus, there is a need for a stem seal with high reliability brought by redundant seals, while allowing for the seals to vent in instances of leakage past the primary seal.

SUMMARY OF THE INVENTION

These and other problems are generally solved or circumvented, and technical advantages are generally achieved, by preferred embodiments of the present invention that provide a valve vented redundant stem seal system, and a method for using the same.

In accordance with an embodiment of the present invention a valve having a stem seal assembly includes a valve body defining a flow passage and a body cavity perpendicular to the flow passage. The valve body defines a stem opening extending from an exterior of the valve body into the body cavity. A valve member is moveable between an open position and a closed position, the valve member blocking the flow passage in the closed position, and allowing flow through the flow passage in the open position. A valve stem has a valve stem axis coupled to the valve member. The valve stem extends from the body cavity to an exterior of the valve body through the stem opening for moving the valve member from the closed position to the open position. A packing assembly seals between the valve stem and the stem opening. The packing assembly includes a packing ring circumscribing the valve stem within the stem opening. A primary dynamic seal is positioned to seal a dynamic leak path between the packing ring and the valve stem. A secondary dynamic seal is spaced axially apart and functionally independent from the primary dynamic seal and positioned to redundantly seal the dynamic leak path. A primary static seal is positioned to seal a static leak path between the packing ring and the valve body. A secondary static seal is paced axially apart and functionally independent from the primary static seal and positioned to redundantly seal the static leak path.

In accordance with another embodiment of the present invention a valve stem packing assembly for sealing a valve stem to a valve body having a body cavity is disclosed. The valve stem packing assembly includes a packing ring circumscribing the valve stem within a stem opening extending axially through the valve body. A primary dynamic seal is positioned to seal a dynamic leak path between the packing ring and the valve stem. The primary dynamic seal includes a metal to metal seal formed by an outer diameter tapered portion of the packing ring sealingly engaging an outer diameter of the valve stem. A secondary dynamic seal is spaced axially apart and functionally independent from the primary dynamic seal and positioned to redundantly seal the dynamic leak path. A primary static seal is positioned to seal a static leak path between the packing ring and the valve body. The primary static seal includes a metal to metal seal formed by an inner diameter tapered portion of the packing ring sealingly engaging an inner diameter of the valve body. A secondary static seal is spaced axially apart and functionally independent from the primary static seal and positioned to redundantly seal the static leak path.

In accordance with yet another embodiment of the present invention, a valve stem packing assembly for sealing a valve stem to a valve body having a body cavity is disclosed. The packing assembly includes a packing ring circumscribing the valve stem within the stem opening. A primary dynamic seal is positioned to seal a dynamic leak path between the packing ring and the valve stem. A secondary dynamic seal is spaced axially apart and functionally independent from the primary dynamic seal and positioned to redundantly seal the dynamic leak path. A primary static seal is positioned to seal a static leak path between the packing ring and the valve body. A secondary static seal is spaced axially apart and functionally independent from the primary static seal and positioned to redundantly seal the static leak path. A packer retainer ring is releasably connected to the valve body, the packer retainer ring engaging a surface of the packing ring, transferring axial load on the packing ring to the valve body. The secondary dynamic seal and the secondary static seal each include an annular seal stand off having a first end and a second end. A seal ring has a chevron profile positioned on the seal stand off so that the second end of the seal stand off inserts into the chevron profile. The seal ring defines a first and a second leg extending from an apex of the chevron profile radially outward, the first and second legs sealing to opposing annular surfaces of the valve stem and the valve body. A back ring has a chevron channel that receives an apex of the seal ring, the back ring having a greater stiffness to radial movement than the first and second legs of the seal ring to limit radial deformation of the first and second legs of the seal ring. The first end of the seal stand off has a substantially flat portion positioned on a supportive shoulder of one of the packing assembly and the valve body. The second end of the seal stand off is in operative engagement with the chevron profile.

An advantage of a preferred embodiment is that it provides true redundant sealing while still allowing for pressure relief venting when needed. Any leakage past the primary seal does not cause damage to, or further failure of, the primary seal when fluid vents past the primary seal when the valve is opened. Still further, the seals operate independently to reduce the wear on the seal assembly and prolong the life of the seal assembly.

BRIEF DESCRIPTION OF THE DRAWINGS

So that the manner in which the features, advantages and objects of the invention, as well as others which will become apparent, are attained, and can be understood in more detail, more particular description of the invention briefly summarized above may be had by reference to the embodiments thereof which are illustrated in the appended drawings that form a part of this specification. It is to be noted, however, that the drawings illustrate only a preferred embodiment of the invention and are therefore not to be considered limiting of its scope as the invention may admit to other equally effective embodiments.

DETAILED DESCRIPTION OF THE PREFERRED EMBODIMENT

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

In the following discussion, numerous specific details are set forth to provide a thorough understanding of the present invention. However, it will be obvious to those skilled in the art that the present invention may be practiced without such specific details. Additionally, for the most part, details concerning valve construction, uses, and the like have been omitted inasmuch as such details are not considered necessary to obtain a complete understanding of the present invention, and are considered to be within the skills of persons skilled in the relevant art.

Figure 1:
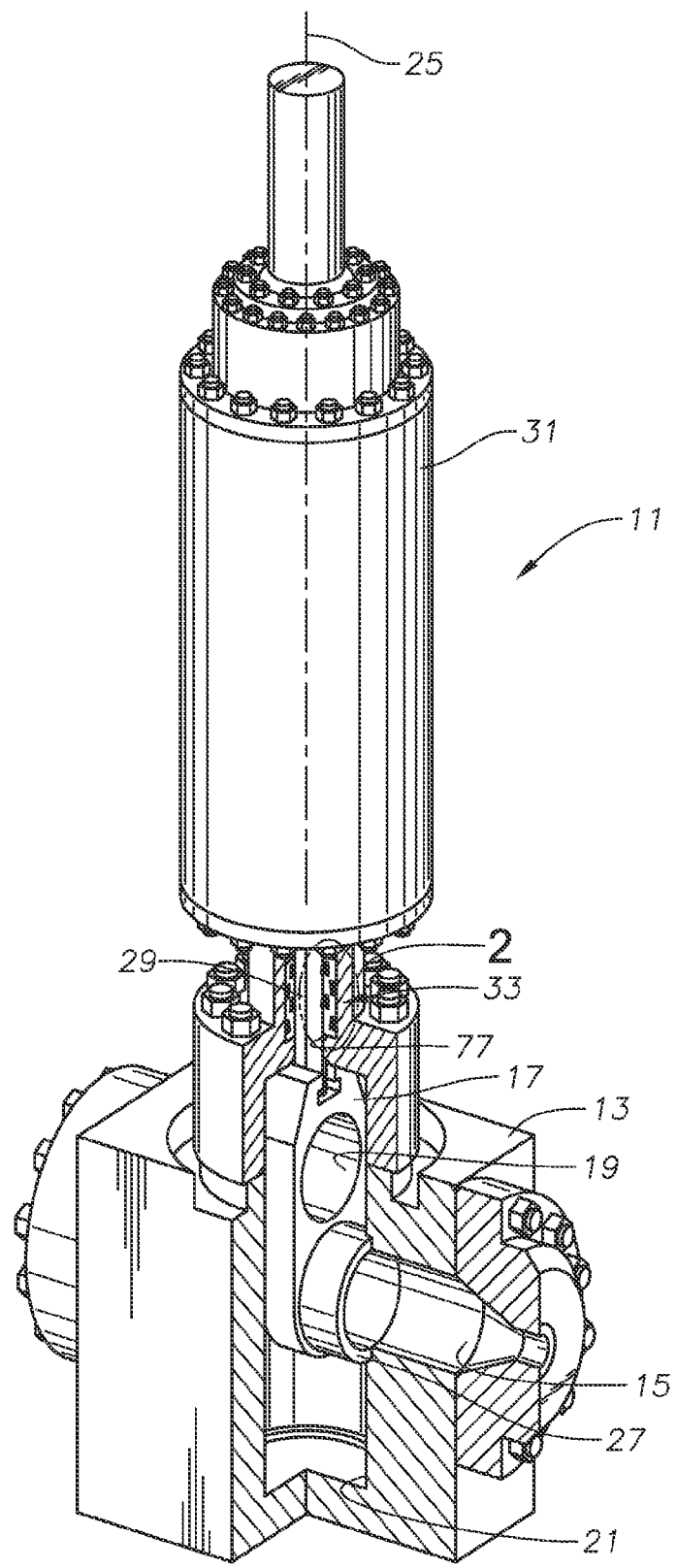
FIG. 1 is a partial sectional view of a gate valve in accordance with an embodiment of the present invention.

Referring to FIG. 1, gate valve 11 has a valve body 13 and a flow passage 15 that extends transversely through valve body 13. Valve 11 has a valve member such as gate 17 with a hole 19 there through. Gate 17 can be designed in one piece or two pieces. Gate 17 may be split into two slabs; each slab of gate 17 must either be open or closed at the same time. Gate 17 is shown in the closed position in FIG. 1. Valve 11 shown in FIG. 1 is a rising-stem type valve; however, this invention can similarly be used on non-rising-stem type valves. When gate 17 is in the open position, hole 19 of gate 17 registers with flow passage 15 of valve body 13 thereby allowing flow through valve 11. When gate 17 is closed as shown, hole 19 no longer registers with flow passage 15, blocking flow of fluid through passage 15 and valve 11. Flow passage 15 intersects a central chamber or cavity 21 located in valve body 13. A counterbore is formed in flow passage 15 at each intersection with cavity 21. A seat ring 27 locates in each counterbore to seal flow passage 15 to gate 17 while gate 17 is in the closed position. Gate valve 11 also includes a valve stem 29 coupled to gate 17. Valve stem 29 has an axis 25 passing through a center of valve stem 29. Valve stem 29 is linearly moveable without rotation along axis 25 to actuate gate 17 between the open and closed positions. In the illustrated embodiment, a biasing assembly 31 couples to valve body 13 around valve stem 29 to bias valve stem 29 and gate 17 to the closed position. As illustrated, valve 11 is hydraulically actuated. A remotely operated vehicle may interface with biasing assembly 31 to move valve stem 29 and gate 17 from the closed position shown, to an open position wherein hole 19 registers with flow passage 15. A packing assembly 33 provides sealing for valve stem 29 where valve stem 29 passes through valve body 13. A person skilled in the art will understand that gate valve 11 is an exemplary valve. The disclosed embodiments contemplate and include any valve having a stem passing through a valve body to operate a valve member located within the valve body.

Figure 2:
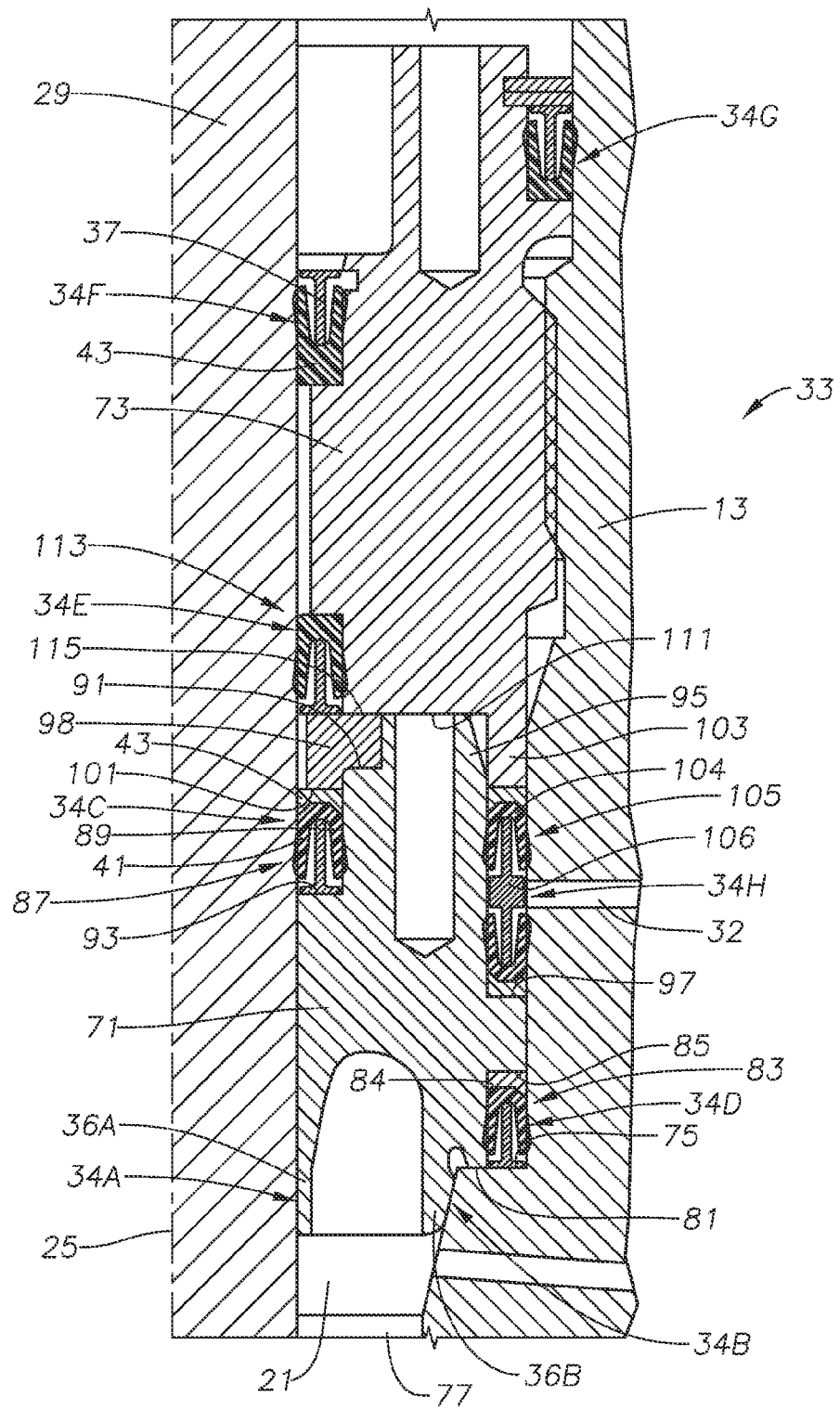
FIG. 2 is a detail view of a portion of the gate valve stem as indicated on FIG. 1 in accordance with an embodiment of the present invention.

Referring to FIG. 2, packing assembly 33 is shown in more detail. Packing assembly 33 includes packing ring 71 that circumscribes valve stem 29. Packing assembly 33 also includes primary dynamic seal 34A, primary static seal 34B, secondary dynamic seal 34C, and secondary static seal 34D. Packing ring 71 has packer retainer ring 73 that is releasably connected to valve body 13. Packer retainer ring 73 engages a surface of packing ring 71, transferring axial load on packing ring 71 to valve body 13. First dynamic retainer seal 34E and second dynamic retainer seal 34F each seal between packer retainer ring 73 and valve stem 29. Static retainer ring seal 34G seals between packer retainer ring 73 and valve body 13.

Primary dynamic seal 34A is positioned to seal a dynamic leak path between packing ring 71 and valve stem 29. Secondary dynamic seal 34C is spaced axially apart and functionally independent from primary dynamic seal 34A and is positioned to redundantly seal the same dynamic leak path that is sealed by primary dynamic seal 34A. The operation or failure of primary dynamic seal 34A and secondary dynamic seal 34C are independent of each other. Primary static seal 34B is positioned to seal a static leak path between packing ring 71 and valve body 13. Secondary static seal 34D is spaced axially apart and functionally independent from primary static seal 34B and positioned to redundantly seal the same static leak path that is sealed by primary static seal 34B. The operation or failure of primary static seal 34B and secondary static seal 34D are independent of each other.

Primary dynamic seal 34A is a metal to metal seal formed by an outer diameter tapered portion 36A of packing ring 71 sealingly engaging an outer diameter of valve stem 29. Primary static seal 34B comprises a metal to metal seal formed by an inner diameter tapered portion 36B of packing ring 71 sealingly engaging an inner diameter of valve body 13.

Packing assembly 33 can also include check valve 34H. Check valve 34H seals between packing ring 71 and valve body 13. Check valve 34H is positioned to allow fluid in a space between packing ring 71 or packer retainer ring 73 and valve body 13 to escape out of port 32, but preventing fluid from entering through port 32 to the space between packing ring 71 or packer retainer ring 73 and valve body 13. Port 32 extends radially through valve body 13.

Figure 3:
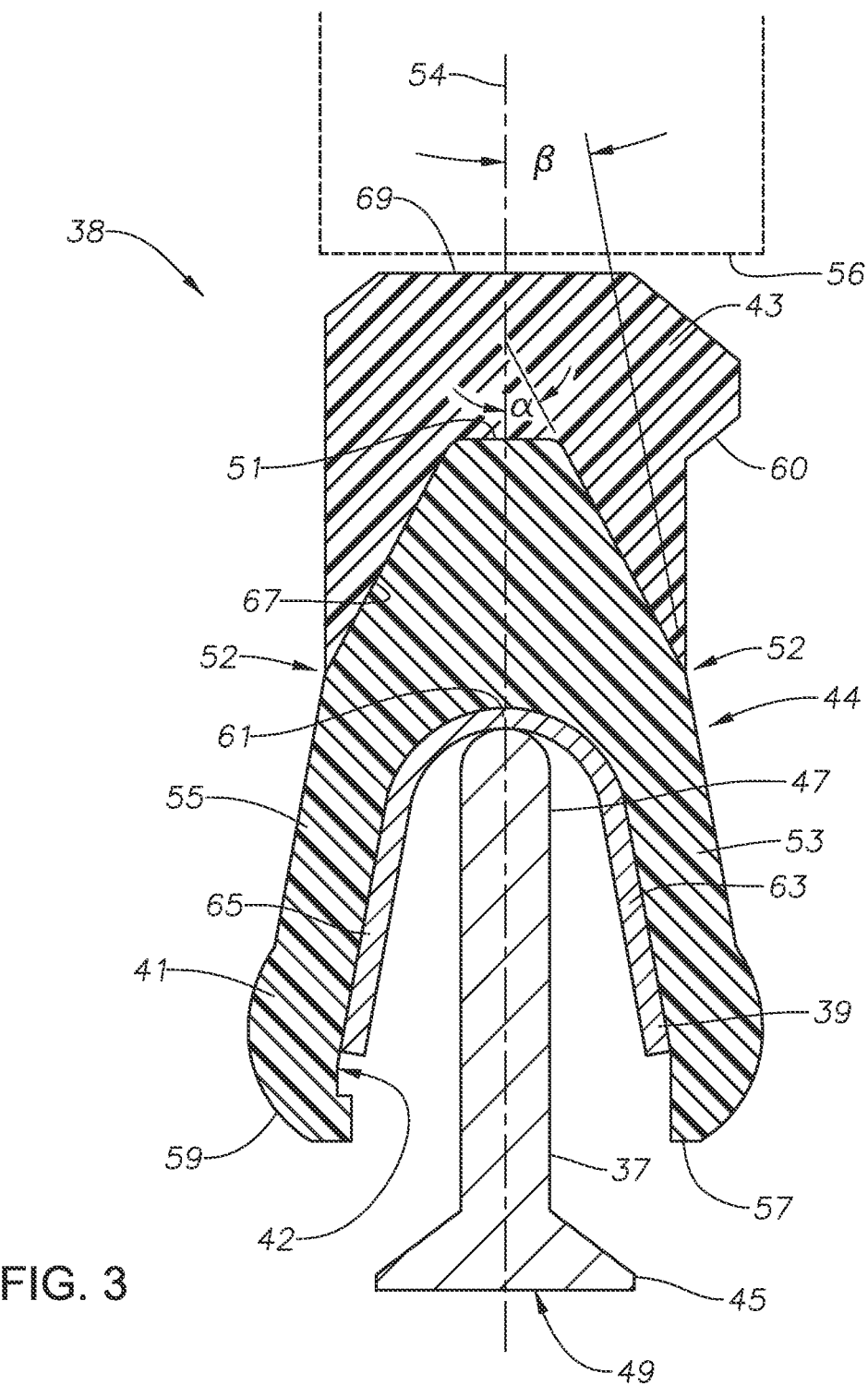
FIG. 3 is a detail view of a gate valve stem seal in accordance with an embodiment of the present invention.

In the embodiment of FIG. 2, secondary dynamic seal 34C, secondary static seal 34D, first dynamic retainer seal 34E, second dynamic retainer seal 34F, and static retainer ring seal 34G are each chevron seal assemblies 38. Check valve 34H includes two chevron seal assemblies 38. Chevron seal assembly 38 includes a stand off 37, a seal ring 41, and a back ring 43. As can be seen in FIG. 3, seal stand off 37 comprises an annular ring or protrusion having a first end 45 and a second end 47. First end 45 of seal stand off 37 has a substantially flat end surface 49 so that seal stand off 37 may be positioned on a supportive cylindrical shoulder within packing assembly 33. Second end 47 of seal stand off 37 is opposite first end 45 and comprises a protrusion. In embodiments without energizing spring 39, second end 47 is in contact with interior surface 42 of seal ring 41 to properly position seal ring 41 against back ring 43 and limit undesired axial compression of seal ring 41. Seal stand off 37 will provide a support for seal ring 41, preventing excessive compression of chevron seal assembly 38 by reacting to forces directed from second end 47 toward first end 45. Seal stand off 37 will be formed of a material having sufficient resistance to compression so that seal stand off 37 will not collapse during operational use of chevron seal assembly 38.

Seal ring 41 comprises an inverted V-shaped, chevron shaped member, or chevron profile so that an apex 51 of the V-shape and the second end 47 of seal stand off 37 face in the same direction. Seal ring 41 also includes a first leg 53 and a second leg 55. First leg 53 and second leg 55 extend toward first end 45 of seal stand off 37. In addition, a width between distal ends 57, 59 of first leg 53 and second leg 55, respectively, is greater than the width between first and second legs 53, 55 of seal ring 41 at apex 51. Thus, seal ring 41 is wider proximate to first end 45 of seal stand off 37 than at apex 51. In the example shown, the exterior surfaces of legs 53, 55 incline at a first angle $\alpha$ from apex 51 to a junction 52. Legs 53, 55 incline at a second angle $\beta$ from junction 52 to distal ends 57, 59. Junction 52 is spaced closer to apex 51 than to distal ends 57, 59. Angle $\beta$ is smaller than angle $\alpha$ relative to an axis 54 bisecting legs 53, 55 and passing through apex 51. When energized, distal ends 57, 59 may contact at least one of valve stem 29 (FIG. 2) and valve body 13. Seal ring 41 has an interior surface 42 facing seal stand off 37 and an exterior surface 44 facing back ring 43. Seal ring 41 may be formed of a fluorocarbon material such as Teflon. A person skilled in the art will understand that other materials having similar properties to the fluorocarbon material disclosed herein are contemplated and included in the disclosed embodiments.

Figure 5:
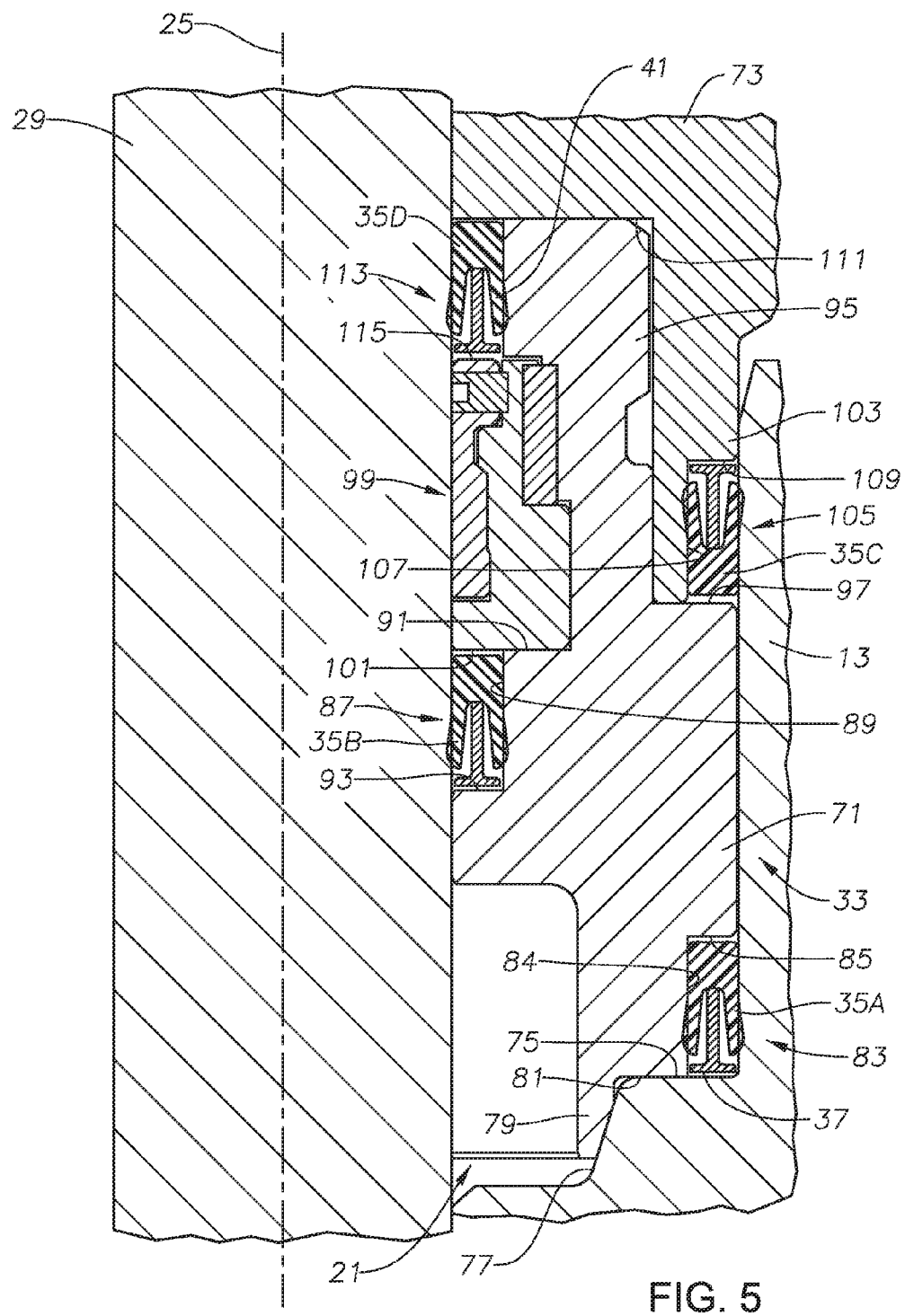
FIG. 5 is a detail view of a portion of the gate valve stem as indicated on FIG. 1 in accordance with an alternate embodiment of the present invention.

Looking at the example embodiments of FIGS. 2 and 5, first and second legs 53, 55 (FIG. 3) can be biased outward so that seal ring 41 will resist compression of first leg 53 and second leg 55 toward seal stand off 37 (FIG. 3) during normal operating conditions. Preferably, seal ring 41 is placed within packing assembly 33, seal ring 41 will undergo a slight displacement toward each other of first leg 53 and second leg 55 of seal ring 41. This displacement causes the compression of seal ring 41, toward seal stand off 37. As a result, when placed within packing assembly 33, first and second legs 53, 55 of seal ring 41 will seal to at least one of valve stem 29 and valve body 13.

Back ring 43 may be an annular ring positioned adjacent seal ring 41 opposite seal stand off 37. Back ring 43 has a generally square shaped cross sectional profile. Preferably, back ring 43 defines a channel 67 adjacent to seal ring 41. Channel 67 may have a V-shaped profile matching the profile of exterior surface 44 formed by seal ring 41 so that channel 67 may abut apex 51 and a portion of exterior surface 44 of seal ring 41. Channel 67 may extend at least part way along exterior surface 44 of first and second legs 53, 55 of seal ring 41. In the embodiment shown, back ring 43 extends along legs 53, 55 less than half of the length of legs 53, 55 from distal ends 57, 59 to apex 51. The tips of back ring 43 are approximate with junction 52. Back ring 43 may have a width less than the width at distal ends 57, 59 of first and second legs 53, 55, respectively, of seal ring 41. Thus, back ring 43 preferably does not seal to either valve stem 29 or valve body 13. Back ring 43 may also have a substantially flat surface 69 opposite end surface 49 of first end 45 of seal stand off 37. Surface 69 may be positioned proximate to an oppositely facing shoulder 56 within packing assembly 33 so that surface 69 may land on the shoulder 56 during operational use of chevron seal assembly 38. In the illustrated embodiment, back ring 43 may be formed of a polyether ether ketone (PEEK) material of sufficient strength to resist yielding or deformation during operational uses that may compress back ring 43 between seal ring 41 and shoulder 56 of packing assembly 33. Preferably, back ring 43 has hardness greater than the hardness of seal ring 41. A person skilled in the art will understand that other materials having similar properties to the PEEK thermoplastic disclosed herein are contemplated and included in the disclosed embodiments. In an embodiment, back ring 43 bonds to seal ring 41. In another embodiment, back ring 43 does not bond to seal ring 41.

Figure 4:
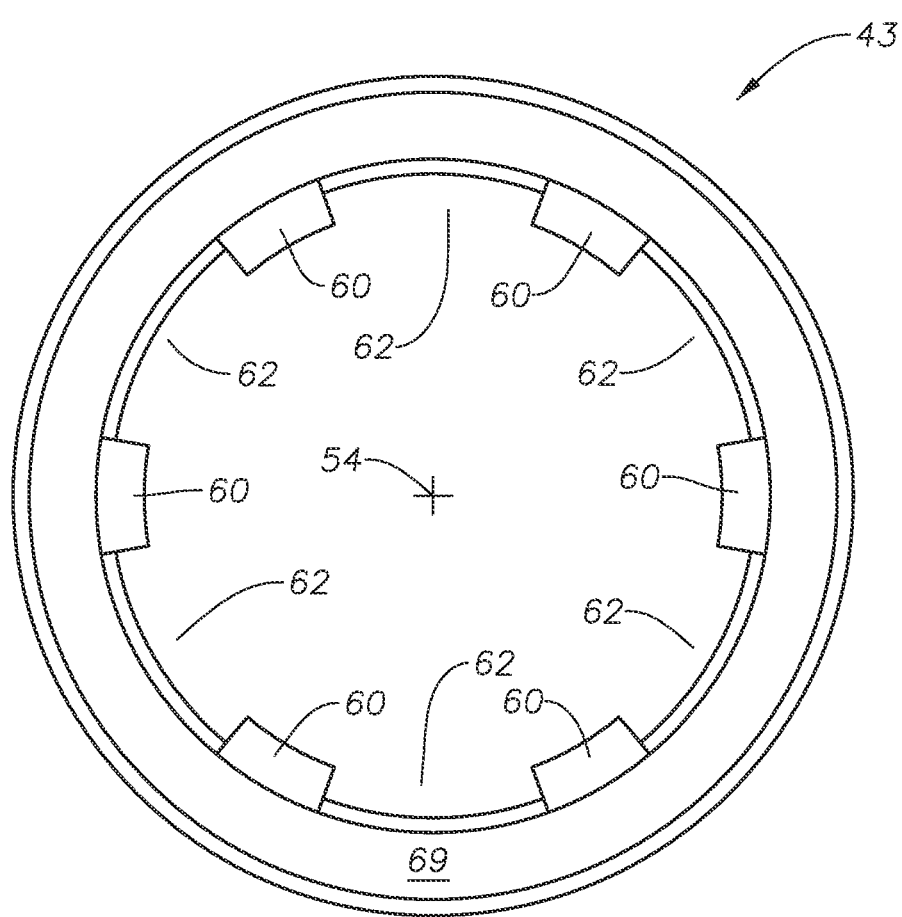
FIG. 4 is a top view of a back ring of a gate valve stem seal in accordance with an embodiment of the present invention.

Back ring 43 also includes a plurality of bumps 60 formed on one or both of the inner diameter surface and the outer diameter surface of back ring 43. For example, chevron seal assembly 38 can include bumps 60 formed on the outer diameter of back ring 43 proximate to packing ring 71 as shown in FIG. 3. In other chevron seal assembly 38 placements, bumps 60 may be formed on the inner diameter of back ring 43. Bumps 60 may be formed of the same material as back ring 43 and integral with back ring 43. Each bump 60 has a generally trapezoidal shaped cross sectional profile, and extends a fractional portion of the circumference of the back ring 43 as shown in FIG. 4. Each bump 60 forms a channel 62 with an adjacent bump 60. Fluid under a higher pressure proximate to surface 69 of back ring 43 vents through channels 62 to flow to an area of lower pressure proximate to interior surface 42 of seal ring 41. Thus, bumps 60 extend the useful life of chevron seal assembly 38 by preventing catastrophic failure of chevron seal assembly 38 due to a buildup of pressure in the non-sealing direction.

In the alternate example of FIG. 3, energizing spring 39 is an annular spring interposed between seal ring 41 and seal stand off 37. Energizing spring 39 has a V-shaped cross-sectional profile similar to that of seal ring 41 so that a surface of energizing spring 39 may contact interior surface 42 of seal ring 41. An apex 61 of energizing spring 39 will face in the same direction as second end 47 of seal stand off 37 and apex 51 of seal ring 41. Energizing spring 39 includes a first leg 63 and a second leg 65 that run parallel to and generally in contact with first leg 53 and second leg 55, respectively. Energizing spring 39 has a spring constant such that energizing spring 39 will resist compression of first leg 63 and second leg 65 toward seal stand off 37 during normal operating conditions. Preferably, when chevron seal assembly 38 is placed within packing assembly 33, seal ring 41 and energizing spring 39 will undergo a slight displacement toward each other of first legs 53, 63 and second legs 55, 65 of seal ring 41 and energizing spring 39, respectively. This displacement causes energizing spring 39 to exert a reactive force against compression of energizing spring 39, and thus compression of seal ring 41, toward seal stand off 37. As a result, when placed within packing assembly 33, energizing spring 39 will cause first and second legs 53, 55 of seal ring 41 to seal to at least one of valve stem 29 and valve body 13. In the illustrated embodiment, energizing spring 39 is formed of a cobalt-chromium-nickel alloy such as ELGILOY®. A person skilled in the art will understand that other materials having similar properties to the cobalt-chromium-nickel alloy disclosed herein are contemplated and included in the disclosed embodiments.

In an operation, chevron seal assembly 38 can perform both sealing and venting functions. As shown in FIG. 3, chevron seal assembly 38 provides a sealing function in response to fluid or gas pressure on interior surface 42 of seal ring 41. As gas or fluid pressure attempts to move from interior surface 42 to exterior surface 44 in FIG. 3. The seal can be initially energized by the outward bias of legs 53,55 or by energizing spring 39 and will prevent passage of fluid or gas past distal ends 57, 59 of seal ring 41. Increasing fluid or gas pressure will exert a force on interior surface 42 of seal ring 41, pushing distal ends 57, 59 and first and second legs 53, 55 of seal ring 41 into tighter sealing contact with the surfaces to which seal ring 41 is sealed. Thus, as pressure increases on interior surface 42, the seal force of seal ring 41 will increase.

As fluid pressure increases on interior surface 42 of seal ring 41, pushing distal ends 57, 59 into tighter sealing contact with adjacent surfaces, back ring 43 will exert a reactive force on exterior surface 44 through channel 67. The portions of legs 53, 55 from junction 52 to distal ends 57, 59 are not directly restrained from flexing outward by back ring 43. Increased fluid pressure applied to interior surface 42 may cause first and second legs, 53, 55 to collapse against adjacent surfaces, or in extreme cases, force portions of first and second legs 53, 55 to extrude between sides of back ring 43 and adjacent surfaces of packing assembly 33 and at least one of valve stem 29 and valve body 13. To counteract this, channel 67 will exert a reactive force to compression of seal ring 41 against back ring 43 caused by increased fluid pressure on interior surface 42. The matching profile of channel 67 and exterior surface 44 will allow channel 67 to resist permanent deformation of seal ring 41. By preventing or limiting permanent deformation of seal ring 41 in situations where high pressure is exerted on interior surface 42, back ring 43 aids in prolonging the operational life of seal ring 41 and chevron seal assembly 38.

As shown in FIG. 3, chevron seal assembly 38 provides a venting function to fluid or gas pressure on exterior surface 44 of seal ring 41. In the event that fluid or gas leaks around seal ring 41 during prolonged use of valve 11, fluid or gas may become trapped in a volume adjacent exterior surface 44. As an example, the fluid may be trapped in a volume or space between dynamic retainer seal 34E and second dynamic retainer seal 34F outside of packer retainer ring 73 and inside of valve stem 29. Alternatively, the fluid may be trapped in a volume or space between secondary static seal 34D and check valve 34H. Continued operation of valve 11 may quickly raise the pressure of the trapped volume of fluid on exterior surface 44 to that of the pressure on interior surface 42 of seal ring 41. When gate 17 moves to the open position, allowing fluid flow through flow passage 15 of valve 11, a pressure differential arises between exterior surface 44 and interior surface 42 of seal ring 41, such that a higher pressure exists on the side of exterior surface 44. The narrower width of back ring 43 relative to the width of seal ring 41 and channels 62 formed by bumps 60 will allow the trapped fluid to flow past back ring 43. Bumps 60 maintain a separation between the inner diameter of packing ring 71 and back ring 43, providing a flow path for the trapped volume of fluid that allows for venting of the fluid under suitable situational conditions. The fluid pressure may then exert a force on exterior surface 44 of seal ring 41 overcoming the outward bias of first and second legs 53, 55 or the spring force of energizing spring 39, as applicable. The higher pressure on exterior surface 44 may compress first and second legs 53, 55 of seal ring 41 to seal stand off 37, removing distal ends 57, 59 from sealing contact with the adjacent surfaces. The trapped fluid or gas may then flow past seal ring 41 to the low pressure side of interior surface 42.

Once sufficient pressure has vented past seal ring 41, the outward bias of first and second legs 53, 55 or spring force of energizing spring 39, as applicable, will overcome the force exerted on exterior surface 44 by the fluid or gas pressure and move distal ends 57, 59 of first and second legs 53, 55, respectively, back into sealing contact with the adjacent surfaces. Seal stand off 37 positions seal ring 41 a sufficient distance from the supporting shoulder in contact with flat end surface 49, allowing this displacement of seal ring 41. In addition, seal stand off 41 prevents axial movement of seal ring 41 during this pressure venting operation. Thus, chevron seal assemblies 38 provides a seal to high pressure forces exerted against interior surface 42 of seal ring 41 and a vent to high pressure forces exerted against exterior surface 44 of seal ring 41. Following venting, seal ring 41 will return to the energized position, preventing flow from interior surface 42 to exterior surface 44 when valve 11 is closed. Seal ring 41 can return to the energized position by the outward bias of first and second legs 53.

As shown in FIG. 2, packing ring 71 lands on an upward facing annular shoulder 75 of valve body 13 formed within a stem opening 77 that allows passage of valve stem 29 into cavity 21. Downward facing shoulder 81 is adapted to land on annular shoulder 75 of valve body 13 so that packing ring 71 will be coaxial with axis 25. Packing ring 71 includes a first annular recess 83 formed on an outer diameter of packing ring 71 proximate to annular shoulder 81. First annular recess 83 extends from the outer diameter of packing ring 71 inward to outwardly facing cylindrical surface 84 and from downward facing shoulder 81 to downward facing recess shoulder 85. First annular recess 83 will have a size and shape such that secondary static seal 34D (or first seal 35A of the example of FIG. 5) may be placed within first annular recess 83. secondary static seal 34D will substantially fill first annular recess 83 and be positioned so that end surface 49 (FIG. 3) of secondary static seal 34D will abut upward facing shoulder 75 of valve body 13 (FIG. 2). Surface 69 of back ring 43 of secondary static seal 34D will be proximate to but optionally may not contact downward facing recess shoulder 85. Preferably, distal end 59 of second leg 55 of seal ring 41 of secondary static seal 34D will contact and seal to outward facing shoulder 84 of packing ring 71 within first annular recess 83. Similarly, distal end 57 of first leg 53 of seal ring 41 of secondary static seal 34D will contact and seal to a surface of valve body 13. Thus, secondary static seal 34D will redundantly seal against movement of fluid from cavity 21 to an exterior of valve body 13, and can vent fluid from an exterior of valve body 13 into cavity 21.

Packing ring 71 also defines a second annular recess 87 on an inner diameter of packing ring 71. Second annular recess 87 extends from the inner diameter surface to radially inward facing shoulder 89 and from an upward facing shoulder 93 towards and upper end of packing ring 71. Packing ring 71 also includes an annular portion 95 extending from an upper end of packing ring 71 near a center of the width of packing ring 71 so that packing ring 71 defines upward facing shoulder 91 on an inner diameter side of annular portion 95 and an upward facing shoulder 97 on an outer diameter side of annular portion 95.

Secondary dynamic seal 34C (or second seal 35B of the example of FIG. 5) will substantially fill second annular recess 87 and be positioned so that end surface 49 (FIG. 3) of secondary dynamic seal 34C will abut upward facing shoulder 93 of packing ring 71 (FIG. 2). Surface 69 of back ring 43 of secondary dynamic seal 34C will be proximate to but may not contact a downward facing surface 101 of spacer ring assembly 98. Preferably, distal end 59 of second leg 55 of seal ring 41 of secondary dynamic seal 34C will contact and seal to an outer diameter surface of valve stem 29. Similarly, distal end 57 of first leg 53 of seal ring 41 of secondary dynamic seal 34C will contact and seal to inward facing shoulder 89 of second annular recess 87 of packing ring 71. Thus, secondary dynamic seal 34C will seal against movement of fluid from cavity 21 to an exterior of valve body 13 along valve stem 29, and can vent fluid into cavity 21 along valve stem 29 from an exterior of valve body 13.

Looking at FIG. 2, packer retainer ring 73 includes an annular protrusion 103 extending from a lower portion of packer retainer ring 73 towards cavity 21. Annular protrusion 103 has a width such that annular protrusion 103 will substantially fill a gap between annular protrusion 95 of packing ring 71 and an inner diameter surface of opening 77.

As illustrated, the outer diameter of annular protrusion 103 can be proximate to, or flush with, the outer diameter of packing ring 71. Third annular recess 105 can be defined between annular protrusion 103 and upward facing shoulder 97 on an outer diameter side of annular portion 95.

Third annular recess 105 will have a size and shape such that check valve 34H (or third seal 35C of the example of FIG. 5) may be placed within third annular recess 105. Check valve 34H will substantially fill third annular recess 105 and has two annular check seal rings 104. Each check seal ring 104 can be chevron seal assembly 38 so that the interior surface 42 of each chevron seal assembly 38 faces towards the other. For check seal rings 104, check seal stand off 106 has a first end and a second end, wherein the first end inserts into the interior radius of one of the seal rings 41 and the second end inserts into the interior radius of the other seal ring 41, to support each of the seal rings 41 on the check seal stand off 106. Check valve 34H can be positioned so that surface 69 of back ring 43 of each chevron seal assembly 38 may be proximate to, or contact, a shoulder. One of the surfaces 69 can be proximate to, or contact, upward facing shoulder 97 on an outer diameter side of annular portion 95. The other surface 69 can be proximate to, or contact, an end of annular protrusion 103.

One leg of each check seal ring 104 will contact and seal to an annular outer surface of annular recess 105. The other leg of each check seal ring 104 will contact and seal to an annular inner surface of valve body 13. Check valve 34H will seal against movement of fluid from an exterior of valve body 13 to cavity 21 through port 32. Check valve 34H can, however, vent fluid from cavity 21 that is either axially above or axially below check valve 34H to an exterior of valve body 13 through port 32.

Packer retainer ring 73 defines a downward facing shoulder 111 extending from a base of annular protrusion 103 to an inner diameter of packer retainer ring 73 proximate to valve stem 29. Annular protrusion 95 of packing ring 71 has a width that extends a portion of the width between annular protrusion 103 of packer retainer ring 73 and the inner diameter of packer retainer ring 73 such that a fourth annular recess 113 exists between annular protrusion 95, downward facing shoulder 111 of packer retainer ring 73, and an upper surface of spacer ring assembly 98. Fourth annular recess 113 extends from an area proximate to valve stem 29 inward to inward facing surface 117 of packer retainer ring 73.

Fourth annular recess 113 will have a size and shape such that first dynamic retainer seal 34E (or fourth seal 35D of the example of FIG. 5) may be placed within fourth annular recess 113. First dynamic retainer seal 34E will substantially fill fourth annular recess 113 and be positioned so that end surface 49 (FIG. 3) of first dynamic retainer seal 34E will abut upper surface 115 of spacer ring assembly 98 (FIG. 2). Surface 69 of back ring 43 of first dynamic retainer seal 34E will be proximate to but may not contact a downward facing shoulder of packer retainer ring 73. Preferably, distal end 57 of first leg 53 of seal ring 41 of first dynamic retainer seal 34E will contact and seal to inward facing surface of packing ring 71 within fourth annular recess 113. Similarly, distal end 59 of second leg 55 of seal ring 41 of first dynamic retainer seal 34E will contact and seal to a surface of valve stem 29. Thus, first dynamic retainer seal 34E will seal against movement of fluid from cavity 21 to an exterior of valve body 13, and will vent fluid into cavity 21.

Looking at the alternate embodiment of FIG. 5 together with FIG. 3, packing assembly 33 includes at least one seal 35, four of which are shown in FIG. 5: a first seal 35A; a second seal 35B; a third seal 35C; and a fourth seal 35D. In the example embodiment of FIG. 5, first seal 35A acts as primary static seal 34B, second seal 35B acts as primary dynamic seal 34A, and fourth seal 35D acts as secondary dynamic seal 34C.

As shown in FIG. 5, each seal 35 includes a stand off 37, and a seal ring 41. Packing ring 71 includes an aligning annular surface 79 on an inner diameter of packing ring 71. Aligning surface 79 is conical and extends from a downward facing shoulder 81 of packing ring 71 into opening 77. Third seal 35C will substantially fill third annular recess 105 and be positioned so that end surface 49 (FIG. 3) of third seal 35C will abut downward facing shoulder 109 of third annular recess 105 (FIG. 2). Surface 69 of back ring 43 of third seal 35C will be proximate to but may not contact upward facing shoulder 91 of packing ring 71. Preferably, distal end 57 of first leg 53 of seal ring 41 of third seal 35C will contact and seal to outward facing shoulder 107 within third annular recess 105. Similarly, distal end 59 of second leg 55 of seal ring 41 of third seal 35C will contact and seal to a surface of valve body 13. Thus, third seal 35C will seal against movement of fluid from an exterior of valve body 13 to cavity 21, and will vent fluid from cavity 21 to an exterior of valve body 13.

A load ring assembly 99 will be positioned on upward facing shoulder 91 and extend upward a portion of the length of annular protrusion 95. Load ring assembly 99 may comprise any suitable assembly adapted to transfer load from second seal 35B to packing ring 71. In the illustrated embodiment, load ring assembly 99 does not transfer a load applied to second seal 35B to fourth seal 35D so that second seal 35B and fourth seal 35D operate independently of each other. In an exemplary embodiment, load ring assembly 99 comprises a stem assembly similar to "Segmented Seal Ring and Support for Same" as disclosed in pending U.S. patent application Ser. No. 13/281,526, filed Oct. 26, 2011, and incorporated by reference in its entirety herein. A person skilled in the art will recognize that other suitable annular stem assemblies may be used provided that the valve stem assembly allows for independent loading of second seal 35B and fourth seal 35D.

In such an embodiment, annular protrusion 95 of packing ring 71 has a width that extends a portion of the width between annular protrusion 103 of packer retainer ring 73 and the inner diameter of packer retainer ring 73 such that a fourth annular recess 113 exists between annular protrusion 95, downward facing shoulder 111 of packer retainer ring 73, and an upper surface 115 of load ring assembly 99.

As illustrated in the alternate embodiment of FIG. 5, second seal 35B and fourth seal 35D are positioned so that the seals seal to valve stem 29 to prevent flow of fluid out of cavity 21 along valve stem 29 while allowing fluid that may leak past second seal 35B to vent back into cavity 21. This provides a redundant sealing system that is more effective than prior art sealing methods. Similarly, the combined second and fourth seals 35B, 35D provide fluid venting that prevents damage to the seals where fluid pressure within cavity 21 is suddenly released. Similarly, first seal 35A and third seal 35C are positioned to prevent fluid flow into cavity 21 along valve body 13. Unlike seals 35B and 35D, seals 35A and 35C do not provide redundant protection. Instead, first and third seals 35A, 35C, respectively, provide opposite direction sealing. This potentially reduces the amount of fluid that may pass between an exterior of valve body 13 and cavity 21. In addition, first and third seals 35A, 35C, respectively, provide opposite direction venting that protects both seals from damage in the event of a sudden pressure change in the area sealed. A person skilled in the art will understand that the sealing and venting directions of each seal may be switched by flipping the position of each seal as needed.

Accordingly, the disclosed embodiments provide numerous advantages over the prior art. For example, the disclosed embodiments provide a redundant sealing system that provides two independent and verifiable seals along the valve stem of the valve. This greatly improves effectiveness and reliability over prior art stem seals. In addition, the disclosed embodiments provide a venting mechanism to allow for release of fluid that has leaked past the seals to vent in response to quick changes in fluid pressure within the valve cavity. This prevents damage to the first seal that may be caused by known leakage issues in all valve sealing mechanisms. In turn, this prolongs the life of the seal.

It is understood that the present invention may take many forms and embodiments. Accordingly, several variations may be made in the foregoing without departing from the spirit or scope of the invention. Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A valve having a stem seal assembly comprising:
    a valve body defining a flow passage and a body cavity perpendicular to the flow passage;
    the valve body further defining a stem opening extending from an exterior of the valve body into the body cavity;
    a valve member moveable between an open position and a closed position, the valve member blocking the flow passage in the closed position, and allowing flow through the flow passage in the open position;
    a valve stem having a valve stem axis coupled to the valve member, the valve stem extending from the body cavity to an exterior of the valve body through the stem opening for moving the valve member from the closed position to the open position;
    a packing assembly sealing between the valve stem and the stem opening, the packing assembly including:
        a packing ring circumscribing the valve stem within the stem opening;
        a primary dynamic seal positioned to seal a dynamic leak path between the packing ring and the valve stem;
        a unitary secondary dynamic seal spaced axially apart and functionally independent from the primary dynamic seal and positioned to redundantly seal the dynamic leak path;
        a primary static seal positioned to seal a static leak path between the packing ring and the valve body; and
        a secondary static seal spaced axially apart and functionally independent from the primary static seal and positioned to redundantly seal the static leak path; and
    wherein the secondary dynamic seal and the secondary static seal each include a seal ring having:

a chevron profile defining a first leg and a second leg extending radially outward from an interior radius defined in an apex of the chevron profile, the first and second legs sealing to opposing annular surfaces: and a stand off having a first end and a second end, wherein the first end is positioned on a supportive shoulder and the second end inserts into the interior radius defined in the apex of the chevron profile to support the chevron profile on the stand off; and wherein the seal ring of the secondary dynamic seal and the secondary static seal each comprise a back ring having a chevron channel that receives the apex of the chevron profile, the back ring having a greater stiffness to radial movement than the first and second legs to limit radial deformation of the first and second legs.

2. The valve of claim 1, wherein the primary dynamic seal comprises a metal to metal seal formed by an outer diameter tapered portion of the packing ring sealingly engaging an outer diameter of the valve stem.

3. The valve of claim 1, wherein the primary static seal comprises a metal to metal seal formed by an inner diameter tapered portion of the packing ring sealingly engaging an inner diameter of the valve body.

4. The valve of claim 1, further comprising a plurality of bumps circumferentially spaced apart on the back ring, defining a plurality of fluid channels through which a fluid can vent past a sealing surface of the seal ring.

5. The valve of claim 1, further comprising a packer retainer ring releasably connected to the valve body, the packer retainer ring engaging a surface of the packing ring, transferring axial load on the packing ring to the valve body.

6. The valve of claim 5, further comprising a static retainer ring seal sealing between the packer retainer ring and the valve body, and a dynamic retainer seal sealing between the packer retainer ring and the valve stem.

7. The valve of claim 1, further comprising:
a port extending radially through the valve body; and
a check valve sealing between the packing ring and the valve body, the check valve positioned to allow a fluid in a space between the packing ring and the valve body to escape out of the port, but preventing the fluid from entering through the port to the space between the packing ring and the valve body.

8. The valve of claim 7, wherein the check valve comprises:
two annular check seal rings, each check seal ring having a chevron profile defining a first leg and a second leg extending radially outward from an interior radius defined in an apex of the chevron profile, the first and second legs sealing to opposing annular surfaces;
a back ring associated with each check seal ring and having a chevron channel that receives the apex of the chevron profile, the back ring having a greater stiffness to radial movement than the first and second legs to limit radial deformation of the first and second legs; and
a check seal stand off having a first end and a second end, wherein the first end inserts into the interior radius of one of the check seal rings and the second end inserts into the interior radius of the other of the check seal rings, to support each of the check seal rings on the check seal stand off.

9. A valve stem packing assembly for sealing a valve stem to a valve body having a body cavity, the packing assembly comprising:

a packing ring circumscribing the valve stem within a stem opening extending axially through the valve body;
a primary dynamic seal positioned to seal a dynamic leak path between the packing ring and the valve stem, wherein the primary dynamic seal comprises a metal to metal seal formed by an outer diameter tapered portion of the packing ring sealingly engaging an outer diameter of the valve stem;
a unitary secondary dynamic seal spaced axially apart and functionally independent from the primary dynamic seal and positioned to redundantly seal the dynamic leak path;
a primary static seal positioned to seal a static leak path between the packing ring and the valve body, wherein the primary static seal comprises a metal to metal seal formed by an inner diameter tapered portion of the packing ring sealingly engaging an inner diameter of the valve body;
a secondary static seal spaced axially apart and functionally independent from the primary static seal and positioned to redundantly seal the static leak path; and
wherein the secondary dynamic seal and the secondary static seal each include:
an annular seal stand off having a first end and a second end;
a seal ring having a chevron profile positioned on the seal stand off so that the second end of the seal stand off inserts into the chevron profile wherein the seal ring defines a first leg and a second leg extending from an apex of the chevron profile radially outward, the first and second legs sealing to opposing annular surfaces of the valve stem and the valve body;
wherein the first end of the seal stand off has a substantially flat portion positioned on a supportive shoulder of one of the packing assembly and the valve body, and the second end of the seal stand off is in operative engagement with the chevron profile; and a check valve sealing between the packing ring and the valve body, the check valve positioned to allow a fluid in a space between the packing ring and the valve body to escape out of a port that extends radially through the valve body, but preventing the fluid from entering through the port to the space between the packing ring and the valve body, the check valve comprising:
two annular check seal rings, each check seal ring having a chevron profile defining a first leg and a second leg extending radially outward from an interior radius defined in an apex of the chevron profile, the first and second legs sealing to opposing annular surfaces;
a back ring associated with each check seal ring and having a chevron channel that receives the apex of the chevron profile, the back ring having a greater stiffness to radial movement than the first and second legs to limit radial deformation of the first and second legs; and
a check seal stand off having a first end and a second end, wherein the first end inserts into the interior radius of one of the check seal rings and the second end inserts into the interior radius of the other of the check seal rings, to support each of the check seal rings on the check seal stand off.

10. The valve stem packing assembly of claim 9, wherein the secondary dynamic seal and the secondary static seal each comprises a back ring having a chevron channel that receives the apex of the seal ring, the back ring having a greater stiffness to radial movement than the first and second legs of the seal ring to limit radial deformation of the first and second legs of the seal ring.

11. The valve stem packing assembly of claim 10, further comprising a plurality of bumps circumferentially spaced apart on the back ring, defining a plurality of fluid channels, allowing a fluid to vent past a sealing surface of the seal ring.

12. The valve stem packing assembly of claim 10, further comprising a bump formed on an outer surface of the back ring opposite an end of the seal ring that seals to the valve stem and the valve body, the bump forming one or more fluid channels so that a fluid may vent past a sealing surface of the seal ring.

13. The valve stem packing assembly of claim 10, wherein the secondary dynamic seal and the secondary static seal are spring energized seals.

14. The valve stem packing assembly of claim 10, further comprising a packer retainer ring releasably connected to the valve body, the packer retainer ring engaging a surface of the packing ring, transferring axial load on the packing ring to the valve body.

15. The valve stem packing assembly of claim 14, further comprising a static retainer ring seal sealing between the packer retainer ring and the valve body, and a dynamic retainer ring seal sealing between the packer retainer ring and the valve stem.

16. A valve stem packing assembly for sealing a valve stem to a valve body having a body cavity, the packing assembly comprising:
  a packing ring circumscribing the valve stem within a stem opening;
  a primary dynamic seal positioned to seal a dynamic leak path between the packing ring and the valve stem;
  a secondary dynamic seal spaced axially apart and functionally independent from the primary dynamic seal and positioned to redundantly seal the dynamic leak path;
  a primary static seal positioned to seal a static leak path between the packing ring and the valve body;
  a secondary static seal spaced axially apart and functionally independent from the primary static seal and positioned to redundantly seal the static leak path; and
  a packer retainer ring releasably connected to the valve body, the packer retainer ring engaging a surface of the packing ring, transferring axial load on the packing ring to the valve body; and
  wherein the secondary dynamic seal and the secondary static seal each comprises:
    an annular seal stand off having a first end and a second end;
    a seal ring having a chevron profile positioned on the seal stand off so that the second end of the seal stand off inserts into the chevron profile, wherein the seal ring defines a first leg and a second leg extending from an apex of the chevron profile radially outward, the first and second legs sealing to opposing annular surfaces of the valve stem and the valve body;
    a back ring having a chevron channel that receives the apex of the seal ring, the back ring having a greater stiffness to radial movement than the first and second legs of the seal ring to limit radial deformation of the first and second legs of the seal ring; and
    wherein the first end of the seal stand off has a substantially flat portion positioned on a supportive shoulder of one of the packing assembly and the valve body, and the second end of the seal stand off is in operative engagement with the chevron profile.

17. The valve stem packing assembly of claim 16, wherein the primary dynamic seal comprises a metal to metal seal formed by an outer diameter tapered portion of the packing ring sealingly engaging an outer diameter of the valve stem, and the primary static seal comprises a metal to metal seal formed by an inner diameter tapered portion of the packing ring sealingly engaging an inner diameter of the valve body.

18. The valve stem packing assembly of claim 16, further comprising a check valve sealing between the packing ring and the valve body, the check valve positioned to allow a fluid in a space between the packing ring and the valve body to escape out of a port that extends radially through the valve body, but preventing the fluid from entering through the port to the space between the packing ring and the valve body, the check valve having:
  two annular check seal rings, each check seal ring having a chevron profile defining a first leg and a second leg extending radially outward from an interior radius defined in an apex of the chevron profile, the first and second legs sealing to opposing annular surfaces;
  a back ring associated with each check seal ring and having a chevron channel that receives the apex of the chevron profile, the back ring having a greater stiffness to radial movement than the first and second legs to limit radial deformation of the first and second legs; and
  a check seal stand off having a first end and a second end, wherein the first end inserts into the interior radius of one of the check seal rings and the second end inserts into the interior radius of the other of the check seal rings, to support each of the check seal rings on the check seal stand off.

19. A valve having a stem seal assembly comprising:
  a valve body defining a flow passage and a body cavity perpendicular to the flow passage;
  the valve body further defining a stem opening extending from an exterior of the valve body into the body cavity;
  a valve member moveable between an open position and a closed position, the valve member blocking the flow passage in the closed position, and allowing flow through the flow passage in the open position;
  a valve stem having a valve stem axis coupled to the valve member, the valve stem extending from the body cavity to an exterior of the valve body through the stem opening for moving the valve member from the closed position to the open position;
  a packing assembly sealing between the valve stem and the stem opening, the packing assembly including:
    a packing ring circumscribing the valve stem within the stem opening;
    a primary dynamic seal positioned to seal a dynamic leak path between the packing ring and the valve stem;
    a secondary dynamic seal spaced axially apart and functionally independent from the primary dynamic seal and positioned to redundantly seal the dynamic leak path;
    a primary static seal positioned to seal a static leak path between the packing ring and the valve body; and
    a secondary static seal spaced axially apart and functionally independent from the primary static seal and positioned to redundantly seal the static leak path;
  a port extending radially through the valve body;
  a check valve sealing between the packing ring and the valve body, the check valve positioned to allow a fluid in a space between the packing ring and the valve body to escape out of the port, but preventing the fluid from entering through the port to the space between the packing ring and the valve body; and wherein the check valve includes two annular check seal rings, each check seal ring having a chevron profile defining a first leg and a second leg extending radially outward from an interior radius defined in an apex of the chevron profile, the first and second legs sealing to opposing annular surfaces; and a check seal stand off having a first end and a second end, wherein the first end inserts into the interior radius of one of the check seal rings and the second end inserts into the interior radius of the other of the check seal rings, to support each of the check seal rings on the check seal stand off.

* * * * *